United States Patent
Tang et al.

(10) Patent No.: US 8,514,984 B2
(45) Date of Patent: Aug. 20, 2013

(54) ITERATIVE DECODING ARCHITECTURE WITH HARQ COMBINING AND SOFT DECISION DIRECTED CHANNEL ESTIMATION

(75) Inventors: Jia Tang, Campbell, CA (US); Atul A. Salvekar, San Francisco, CA (US); Parvathanathan Subrahmanya, Sunnyvale, CA (US); Andrew Sendonaris, Campbell, CA (US); Shantanu Khare, Chicago, IL (US); Jong Hyeon Park, San Jose, CA (US); Brian C. Banister, San Diego, CA (US); Tao Cui, Durham, NC (US)

(73) Assignee: QUALCOMM Incorporated, San Diego, CA (US)

( * ) Notice: Subject to any disclaimer, the term of this patent is extended or adjusted under 35 U.S.C. 154(b) by 464 days.

(21) Appl. No.: 12/563,655

(22) Filed: Sep. 21, 2009

(65) Prior Publication Data

US 2011/0051860 A1    Mar. 3, 2011

Related U.S. Application Data

(63) Continuation-in-part of application No. 12/552,673, filed on Sep. 2, 2009.

(51) Int. Cl.
*H04L 27/06* (2006.01)
(52) U.S. Cl.
USPC ............................................... 375/341
(58) Field of Classification Search
USPC .............. 375/341, 130, 147, 262, 316, 340, 375/347, 349; 714/748, 752, 780, 794
See application file for complete search history.

(56) References Cited

U.S. PATENT DOCUMENTS

| | | | |
|---|---|---|---|
| 6,166,667 A | 12/2000 | Park | |
| 7,162,683 B2 | 1/2007 | Buné | |
| 7,222,286 B2 | 5/2007 | Kim | |
| 8,199,034 B2 | 6/2012 | Salvekar et al. | |
| 2004/0258139 A1* | 12/2004 | Namgoong et al. | 375/147 |
| 2006/0188044 A1 | 8/2006 | Wang et al. | |
| 2007/0041475 A1 | 2/2007 | Koshy et al. | |
| 2007/0140320 A1* | 6/2007 | Banna et al. | 375/148 |
| 2007/0201632 A1 | 8/2007 | Ionescu | |
| 2008/0304589 A1 | 12/2008 | Tsuruta et al. | |
| 2009/0067553 A1* | 3/2009 | McElwain | 375/341 |
| 2009/0254797 A1* | 10/2009 | Wu et al. | 714/794 |
| 2009/0287859 A1 | 11/2009 | Bond et al. | |

(Continued)

FOREIGN PATENT DOCUMENTS

| | | |
|---|---|---|
| EP | 1217776 A2 | 6/2002 |
| EP | 1432129 A2 | 6/2004 |
| WO | WO0119013 | 3/2001 |
| WO | WO2007000917 A1 | 1/2007 |

OTHER PUBLICATIONS

Bertrand M. Hochwald and Stephan Ten Brink: "Achieving Near-Capacity on aMultiple-Antenna Channel" IEEE Transactions on Communications vol. 51, No. 3, Mar. 1, 2003, XP002603968.

(Continued)

*Primary Examiner* — Khai Tran
(74) *Attorney, Agent, or Firm* — Kevin T. Cheatham

(57) ABSTRACT

Certain aspects of the present disclosure relate to a method for iterative decoding with re-transmissions of data and to a method for iterative decoding with soft decision directed channel estimation.

43 Claims, 12 Drawing Sheets

(56) References Cited

U.S. PATENT DOCUMENTS

| | | |
|---|---|---|
| 2009/0300463 A1 | 12/2009 | Purkovic et al. |
| 2011/0051831 A1 | 3/2011 | Subrahmanya et al. |
| 2011/0051858 A1 | 3/2011 | Salvekar et al. |
| 2012/0249346 A1 | 10/2012 | Salvekar et al. |

OTHER PUBLICATIONS

International Search Report and Written Opinion—PCT/US2010/045800—International Search Authority, European Patent Office,Feb. 4, 2011.
International Search Report and Written Opinion—PCT/US2010/045813—International Search Authority, European Patent Office,Jan. 25, 2011.
Liu D N et al: "Low complexity affine MMSE detector for iterative detection-decoding MIMO OFDM systems", IEEE Transactions on Communications, IEEE Service Center, Piscataway, NJ, US, vol. 56, No. 1, Jan. 1, 2008, pp. 150-158, XP011224730.
Ming Zhao et al: "An Iterative Receiver with Channel Estimation for MIMO-OFDM Over a Time and Frequency Dispersive Fading Channel", Global Telecommunications Conference, 2007. GLOBECOM '07. IEEE, IEEE, Piscataway, NJ, USA, Nov. 1, 2007, pp. 4155-4159, XP031196718, DOI: DOI:10.1109/GLOCOM.2007.585 ISBN: 978-1-4244-1042-2.
Partial International Search Report—PCT/US2010/045800—International Search Authority, European Patent Office, Nov. 8, 2010.
Uhlemann E et al: "Packet combining and doping in concatenated hybrid ARQ schemes using iterative decoding", Wireless Communications and Networking, 2003. WCNC 2003. 2003 IEEE Mar. 16-20, 2003, Piscataway, NJ, USA,IEEE LNKD-D0I: 10.1109/WCNC.2003.1200482, vol. 2, Mar. 16, 2003, pp. 849-854, XP010639878.
Wooram Shin et al: "Iterative LMMSE Channel Estimation, Detection, and Decoding with a Priori Information for ST-BICM Systems over Block Fading Channels", 2009 IEEE 69th Vehicular Technology Conference; Apr. 26-29, 2009, Barcelona, Spain, IEEE, Piscataway, NJ, USA, Apr. 26, 2009, pp. 1-6, XP031474572.
Yang Gao et al: "A Novel HARQ Scheme Utilizing the Iterative Soft-information Feedback in MIMO System" I E E E V T S Vehicular Technology Conference. Proceedings, IEEE, US, Apr. 1, 2007, pp. 423-424, XP031092664.
Yeong-Luh Ueng et al: "Turbo coded multiple-antenna systems for near-capacity performance" IEEE Journal on Selected Areas in Communications, IEEE Service Center, Piscataway US vol. 27, No. 6' Aug. 1, 2009, pp. 954-964, XP011264538 ISSN: 0733-8716.
Christophe Laot et al., "Turbo Equalization: Adaptive Equalization and Channel Decoding Jointly Optimized", IEEE Journal on Selected Areas in Communications, IEEE Service Center, Piscataway, US, vol. 19, No. 9, Sep. 1, 2001, XP011055452, ISSN: 0733-8716.
Duho Rhee et al., "Iterative Narrowband Jamming Rejection Technique for Coded OFDMA-CDM Systems", Military Communications Conference, 2009, MILCOM 2009, IEEE, IEEE, Piscataway, NJ, USA, Oct. 18, 2009, pp. 1-6, XP031609645, ISBN: 978-1-4244-5238-5.
Siti et al., "A Novel Soft-Output Layered Orthogonal Lattice Detector for Multiple Antenna Communications," IEEE ICC 2006 proceedings, pp. 1686-1691.
Siti, et al., "Layered Orthogonal Lattice Detector for Two Transmit Antenna Communications," in Allerton Conference on Communication, Control and Computing, Sep. 2005, pp. 1-10.
Tomasoni , Alessandro et al.: "Turbo-LORD: MAP-Approaching Soft-Input Soft-Output Detector for Iterative MIMO Receivers" IEEE Globecom 2007 Proceedings, Global Telecommunications Conference. Piscataway, NJ, USA, (Nov. 1, 2007), pp. 3504-3508, XP031196593, ISBN: 978-1-4244-1042-2.
Tomasoni, et. al., "A low complexity turbo MMSE Receiver for W-LAN MIMO Systems," Proceedings of IEEE ICC 2006 [9], pp. 4119-4124.

\* cited by examiner

ITERATIVE DECODING ARCHITECTURE WITH HARQ COMBINING AND SOFT DECISION DIRECTED CHANNEL ESTIMATION

CLAIM OF PRIORITY UNDER 35 U.S.C. §120

The present application is a continuation-in-part of copending U.S. patent application Ser. No. 12/552,673 entitled, "Unified Iterative Decoding Architecture using Joint LLR Extraction and A Priori Probability," filed Sep. 2, 2009, and assigned to the assignee hereof and hereby expressly incorporated by reference herein.

BACKGROUND

1. Field

Certain aspects of the present disclosure generally relate to wireless communications and, more particularly, to iterative decoding with re-transmissions and to iterative decoding with soft decision directed channel estimation.

2. Background

Iterative demodulation-decoding structure can be employed at a wireless receiver side to enhance error rate performance. Channel estimates that are utilized for receiver processing can be typically obtained based on a known pilot signal, while actual data are not used. Therefore, further improvement of the error rate performance can be achieved by refining the channel estimates during the iterative demodulation-decoding algorithm by using available reliability information associated with transmitted data.

On the other hand, the Hybrid Automatic Repeat Request (HARQ) approach can be applied in a wireless communications system to improve its quality of service (QoS). The QoS improvement can be achieved by re-transmitting data if a current level of QoS is below a defined threshold value. It is proposed in the present disclosure to efficiently combine the HARQ approach with the iterative demodulation-decoding receiver structure.

SUMMARY

Certain aspects provide a method for wireless communications. The method generally includes receiving at least one data stream, de-mapping and decoding the received data stream in an iterative manner to compute a set of a posteriori log-likelihood ratios (LLRs) of bits of the received data stream, storing the computed set of a posteriori LLRs, if the decoding is performed in the iterative manner a defined number of times, receiving re-transmitted the data stream, and de-mapping and decoding the received re-transmitted data stream in the iterative manner using the stored set of LLRs.

Certain aspects provide an apparatus for wireless communications. The apparatus generally includes a receiver configured to receive at least one data stream, a de-mapper and a decoder configured to de-map and decode the received data stream in an iterative manner to compute a posteriori log-likelihood ratios (LLRs) of bits of the received data stream, and a buffer configured to store the computed a posteriori LLRs, if the decoding is performed in the iterative manner a defined number of times, wherein the receiver is also configured to receive re-transmitted data stream, and wherein the de-mapper and the decoder are also configured to de-map and decode the received re-transmitted data stream in the iterative manner using the stored set of LLRs.

Certain aspects provide an apparatus for wireless communications. The apparatus generally includes means for receiving at least one data stream, means for de-mapping and decoding the received data stream in an iterative manner to compute a posteriori log-likelihood ratios (LLRs) of bits of the received data stream, means for storing the computed a posteriori LLRs, if the decoding is performed in the iterative manner a defined number of times, means for receiving re-transmitted the data stream, and means for de-mapping and decoding the received re-transmitted data stream in the iterative manner using the stored set of LLRs.

Certain aspects provide a computer-program product for wireless communications. The computer-program product includes a computer-readable medium comprising instructions executable to receive at least one data stream, de-map and decode the received data stream in an iterative manner to compute a posteriori log-likelihood ratios (LLRs) of bits of the received data stream, store the computed a posteriori LLRs, if the decoding is performed in the iterative manner a defined number of times, receive re-transmitted data stream, and de-map and decode the received re-transmitted data stream in the iterative manner using the stored set of LLRs.

Certain aspects provide a wireless node. The wireless node generally includes at least one antenna, a receiver configured to receive at least one data stream via the at least one antenna, a de-mapper and a decoder configured to de-map and decode the received data stream in an iterative manner to compute a posteriori log-likelihood ratios (LLRs) of bits of the received data stream, and a buffer configured to store the computed a posteriori LLRs, if the decoding is performed in the iterative manner a defined number of times, wherein the receiver is also configured to receive re-transmitted data stream via the at least one antenna, and wherein the de-mapper and the decoder are also configured to de-map and decode the received re-transmitted data stream in the iterative manner using the stored set of LLRs.

Certain aspects provide a method for wireless communications. The method generally includes receiving a pilot signal and at least one data stream transmitted over a wireless channel, computing initial estimates of the wireless channel using the received pilot signal, de-mapping, de-rate matching and decoding the received data stream using the computed initial estimates of the wireless channel to compute a set of log-likelihood ratios (LLRs) of transmitted bits of the at least one data stream, updating estimates of the wireless channel using the computed set of LLRs and the computed initial estimates of the wireless channel, and de-mapping, de-rate matching and decoding the received data stream using the updated estimates of the wireless channel.

Certain aspects provide an apparatus for wireless communications. The apparatus generally includes a receiver configured to receive a pilot signal and at least one data stream transmitted over a wireless channel, an estimator configured to compute initial estimates of the wireless channel using the received pilot signal, and a de-mapper, a de-rate matching circuit and a decoder configured to de-map, de-rate match and decode the received data stream using the computed initial estimates of the wireless channel to compute a set of log-likelihood ratios (LLRs) of transmitted bits of the data stream, wherein the estimator is also configured to update estimates of the wireless channel using the computed set of LLRs and the computed initial estimates of the wireless channel, and wherein the de-mapper, the de-rate matching circuit and the decoder are also configured to de-map, de-rate match and decode the received data stream using the updated estimates of the wireless channel.

Certain aspects provide an apparatus for wireless communications. The apparatus generally includes means for receiving a pilot signal and at least one data stream transmitted over a wireless channel, means for computing initial estimates of the wireless channel using the received pilot signal, means for de-mapping, de-rate matching and decoding the received data stream using the computed initial estimates of the wireless channel to compute a set of log-likelihood ratios (LLRs) of transmitted bits of the data stream, means for updating estimates of the wireless channel using the computed set of LLRs and the computed initial estimates of the wireless channel, and means for de-mapping, de-rate matching and decoding the received data stream using the updated estimates of the wireless channel.

Certain aspects provide a computer-program product for wireless communications. The computer-program product includes a computer-readable medium comprising instructions executable to receive a pilot signal and at least one data stream transmitted over a wireless channel, compute initial estimates of the wireless channel using the received pilot signal, de-map, de-rate match and decode the received data stream using the computed initial estimates of the wireless channel to compute a set of log-likelihood ratios (LLRs) of transmitted bits of the data stream, update estimates of the wireless channel using the computed set of LLRs and the computed initial estimates of the wireless channel, and de-map, de-rate match and decode the received data stream using the updated estimates of the wireless channel.

Certain aspects provide a wireless node. The wireless node generally includes at least one antenna, a receiver configured to receive via the at least one antenna a pilot signal and at least one data stream transmitted over a wireless channel, an estimator configured to compute initial estimates of the wireless channel using the received pilot signal, and a de-mapper, a de-rate matching circuit and a decoder configured to de-map, de-rate match and decode the received data stream using the computed initial estimates of the wireless channel to compute a set of log-likelihood ratios (LLRs) of transmitted bits of the data stream, wherein the estimator is also configured to update estimates of the wireless channel using the computed set of LLRs and the computed initial estimates of the wireless channel, and wherein the de-mapper, the de-rate matching circuit and the decoder are also configured to de-map, de-rate match and decode the received data stream using the updated estimates of the wireless channel.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
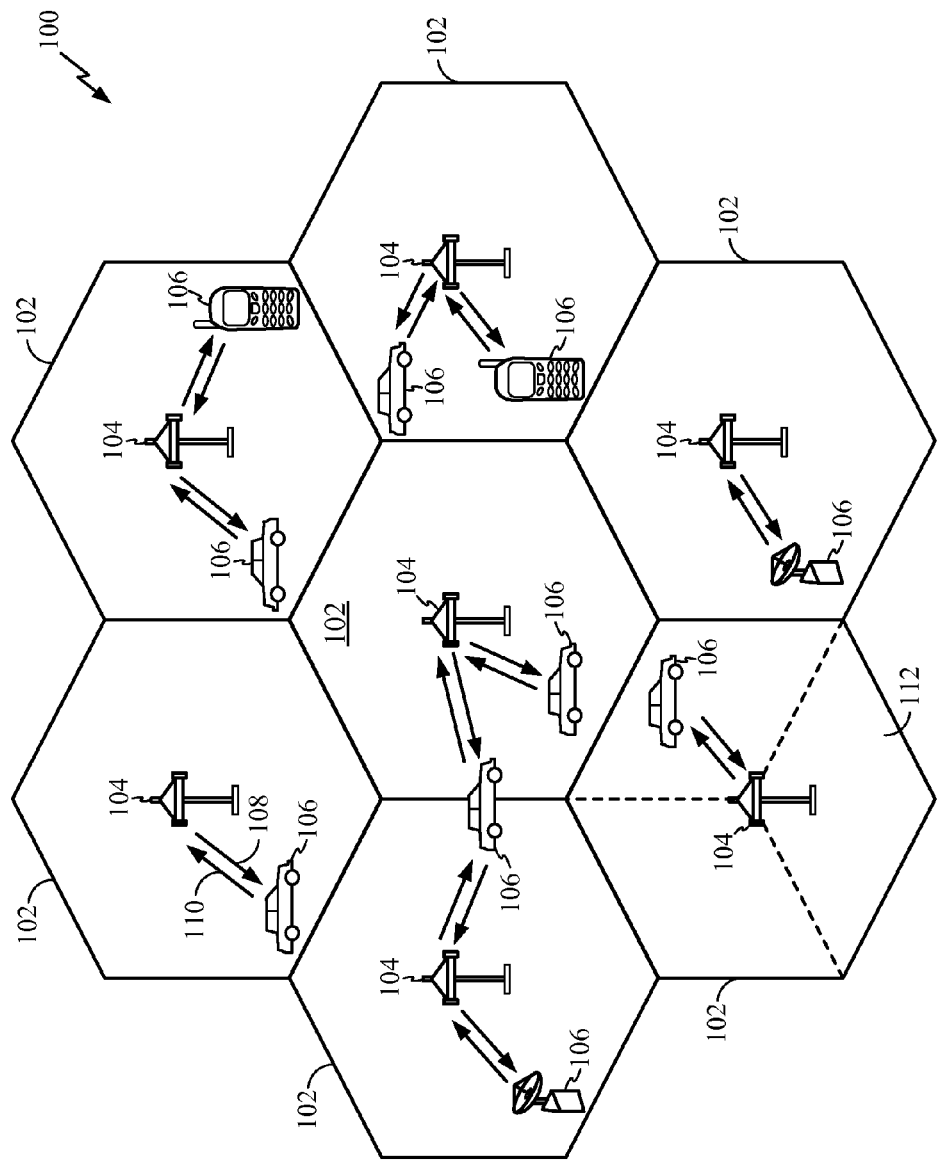
FIG. 1 illustrates an example wireless communication system, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme and a single carrier transmission. Examples of such communication systems include Orthogonal Frequency Division Multiple Access (OFDMA) systems, Single-Carrier Frequency Division Multiple Access (SC-FDMA) systems, Code Division Multiple Access (CDMA), and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A CDMA system may utilize spread-spectrum technology and a coding scheme where each transmitter (i.e., user) is assigned a code in order to allow multiple users to be multiplexed over the same physical channel. The CDMA system may utilize, for example, Wideband Code Division Multiple Access (W-CDMA) protocol, High Speed Packet Access (HSPA) protocol, evolved Speed Packet Access (HSPA+) protocol, etc.

The teachings herein may be incorporated into (e.g., implemented within or performed by) a variety of wired or wireless apparatuses (e.g., nodes). In some aspects, a node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects the node is a wireless node. Such wireless node may provide, for example, connectivity for or to a network (e.g., a wide area network such as the Internet or a cellular network) via a wired or wireless communication link.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with CDMA technique. If this is the case, the wireless communication system 100 may be referred to as a CDMA system.

A communication link that facilitates transmission from a base station 104 to a user terminal 106 may be referred to as a downlink (DL) 108, and a communication link that facilitates transmission from a user terminal 106 to a base station 104 may be referred to as an uplink (UL) 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
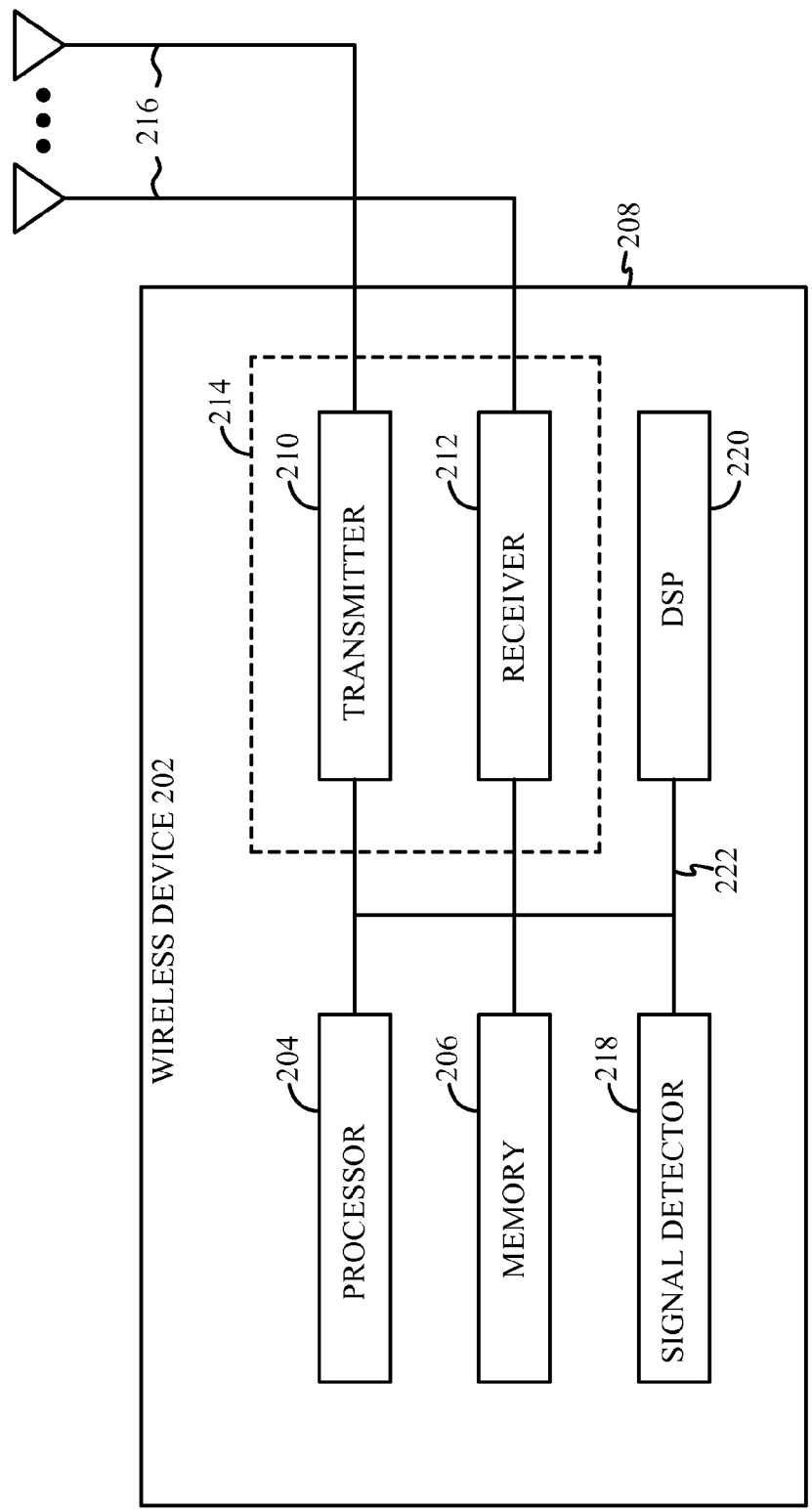
FIG. 2 illustrates various components that may be utilized in a wireless device in accordance with certain aspects of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. A single or a plurality of transmit antennas 216 may be attached to the housing 208 and electrically coupled to the transceiver 214. The wireless device 202 may also include (not shown) multiple transmitters, multiple receivers, and multiple transceivers.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
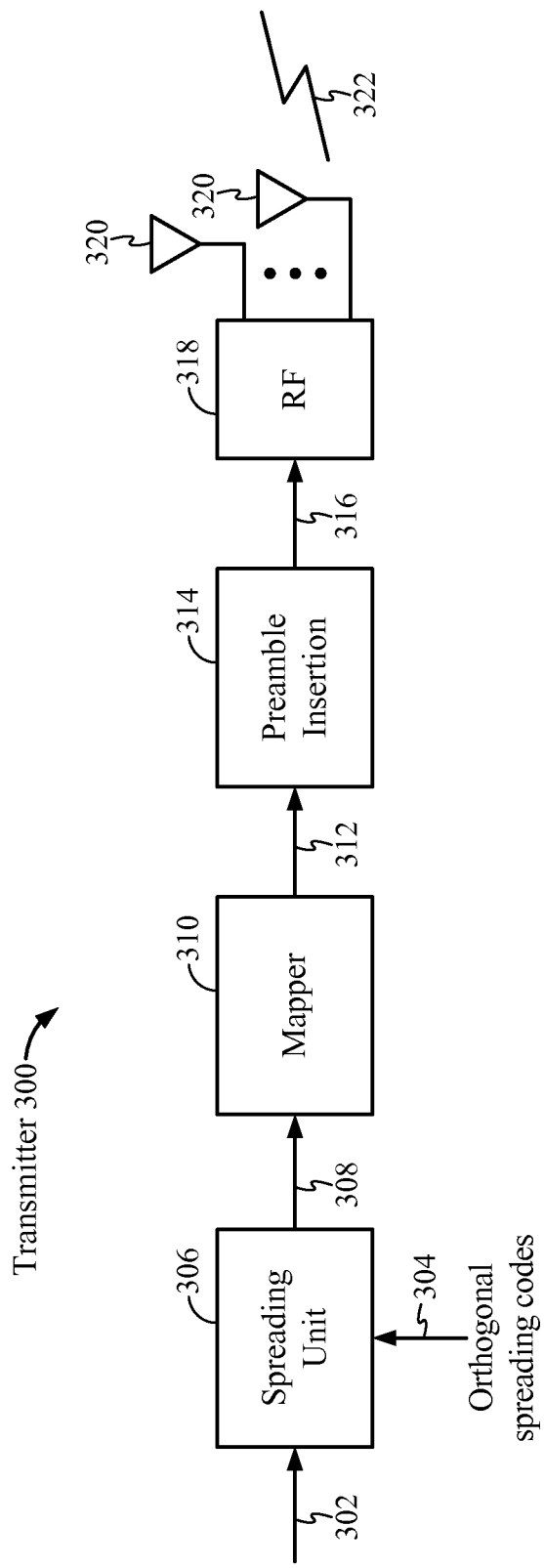
FIG. 3 illustrates an example transmitter that may be used within a wireless communication system in accordance with certain aspects of the present disclosure.

FIG. 3 illustrates an example of a transmitter 300 that may be used within a wireless communication system 100 that utilizes CDMA. Portions of the transmitter 300 may be implemented in the transmitter 210 of a wireless device 202. The transmitter 300 may be implemented in a base station 104 for transmitting data 302 to a user terminal 106 on a downlink 108. The transmitter 300 may also be implemented in a user terminal 106 for transmitting data 302 to a base station 104 on an uplink 110.

Data 302 to be transmitted represent a plurality of signals dedicated to different user terminals 106. Each signal from the plurality of signals may be spread in a spreading unit 306 by corresponding spreading code from a set of orthogonal spreading codes 304. The plurality of spread signals dedicated to different user terminals 106 may be summed to generate a cumulative signal 308. The cumulative signal 308 to be transmitted is shown being provided as input to a mapper 310. The mapper 310 may map the data stream 308 onto constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 310 may output a symbol stream 312, which may represent an input into a preamble insertion unit 314.

The preamble insertion unit 314 may be configured for inserting a preamble sequence at the beginning of the input symbol stream 312, and may generate a corresponding data stream 316. The preamble may be known at the receiver and may be utilized for time and frequency synchronization, channel estimation, equalization and channel decoding. The output 316 of the preamble insertion unit 314 may then be up-converted to a desired transmit frequency band by a radio frequency (RF) front end 318. At least one antenna 320 may then transmit a resulting signal 322 over a wireless channel.

Certain aspects of the present disclosure support an iterative decoding architecture with sophisticated channel estimation that may be implemented within the receiver 212. The proposed iterative receiver structure may be also efficiently used at the receiver 212 for processing data re-transmissions in the case of Hybrid Automatic Repeat Request (HARQ) communication mode.

Iterative Receiver Structure

Iterative demodulation-decoding approach may be applied at a wireless receiver to enhance its error rate performance. The iterative receiver algorithm may comprise two steps that can be performed repeatedly in an interleaved fashion. In one step, a posteriori probability for every transmitted bit may be extracted. For example, a posteriori log likelihood ratio (LLR) information may be obtained after certain number of iterations of outer Turbo decoder on one or more data streams. In another step, the LLR of every transmitted bit may be generated.

In the very first iteration, LLRs may be generated directly from the received signal. For subsequent iterations, the extrinsic part of the a posteriori LLRs along with the received signal may be used to generate new LLRs for the next iteration.

Figure 4:
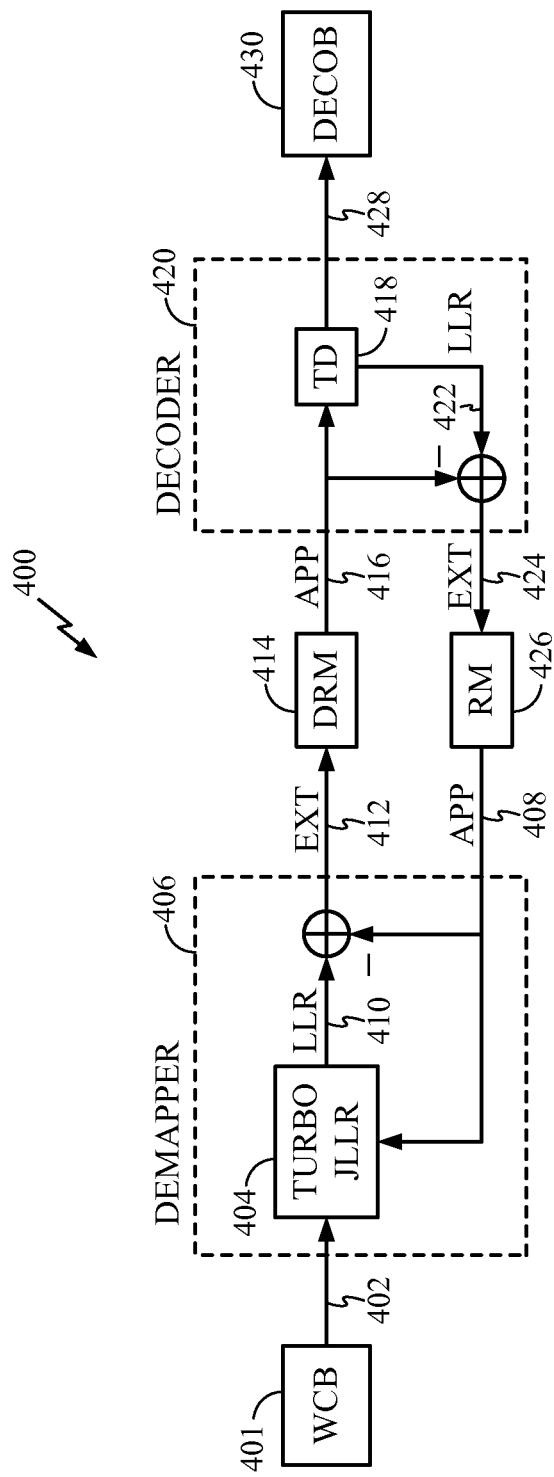
FIG. 4 illustrates an example receiver with iterative decoding structure that may be used within a wireless communication system in accordance with certain aspects of the present disclosure.

FIG. 4 illustrates an example receiver structure 400 based on iterative demodulation-decoding algorithm that may be used within a wireless communication system 100. The iterative structure 400 may be an integral part of the receiver 212 from FIG. 2. The proposed iterative structure 400 is based on LLR extraction jointly performed by a demapper 406 and a Turbo decoder 420.

At least one data stream of symbols transmitted over a wireless channel may be received and stored in a write controller buffer (WCB) 401. The iterative receiver structure 400 may comprise the demapper (i.e., demodulator) 406 and the Turbo decoder 420 that can be iteratively interfaced. A Turbo joint log-likelihood ratio (JLLR) demodulation unit 404 may generate a posteriori LLRs 410 of transmitted bits based on received samples 402 and based on a priori LLRs 408. Extrinsic LLRs 412 may be obtained by subtracting the a priori LLRs 408 from the a posteriori LLRs 410.

The extrinsic LLRs 412 may be processed by a de-rate matching (DRM) unit 414 to generate a priori LLRs 416 of an appropriate rate as input to the Turbo decoder 420. A Turbo decoding (TD) unit 418 may provide hard values of decoded bits 428. In order to improve error rate performance, outer feedback may be employed between the Turbo decoder 420 and the demapper 406. The TD unit 418 may generate a posteriori LLRs 422 that represent soft values of transmitted bits of the at least one data stream, while extrinsic LLRs 424 may be obtained by subtracting the a priori LLRs 416 from the a posteriori LLRs 422.

The extrinsic LLRs 424 may be processed by a rate matching (RM) unit 426 to obtain the a priori LLRs 408 of an appropriate rate. The a priori LLRs 408 may be utilized by the demodulator 406 in the next iteration. LLRs associated with a systematic portion of the transmitted bits and LLRs associated with a parity (i.e., redundant) portion of the transmitted bits may be extracted from the extrinsic LLRs 424. The extracted LLRs related to the systematic bits may be utilized for updating the a priori LLRs 408 for the next processing iteration between the demapper 406 and the decoder 420.

It can be noted that the proposed iterative decoder architecture 400 is different from the well-known hard/soft serial interference cancellation (SIC) architecture. The hard/soft SIC architecture may only be used for multiple-input multiple-output (MIMO) systems, while the proposed iterative decoding architecture may be used for both MIMO and single-input single-output (SISO) systems.

Important feature of the proposed iterative decoder 400 is that the extrinsic output 424 from the Turbo decoder 420 may become the a priori probability (APP) input 408 for the demapper 406 for the next iteration. Similarly, the extrinsic output 412 from the demapper 406 may become the APP input 416 for the Turbo decoder 420. For the very first iteration, APP input may not be available to the demapper 406, and the LLR output 410 of the demapper 406 may be equal to the extrinsic output 412.

Computation of Extrinsic Log Likelihood Ratios

Figure 5:
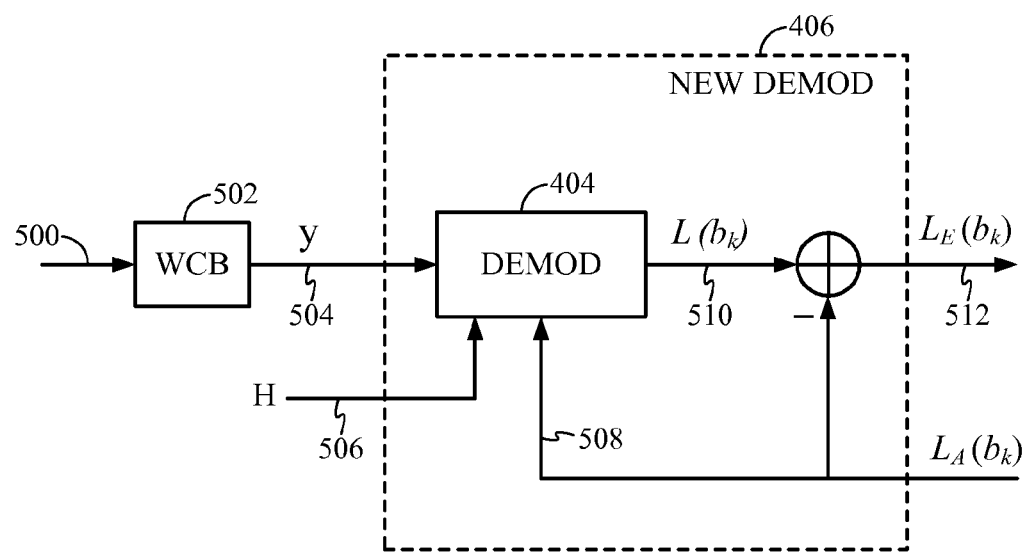
FIG. 5 illustrates an example block diagram of demodulator as a part of the iterative receiver from FIG. 4 in accordance with certain aspects of the present disclosure.

FIG. 5 illustrates an example block diagram of the demapper 406 from FIG. 4 that may generate extrinsic LLRs in accordance with certain aspects of the present disclosure. A received signal 500 may be whitened and stored in a write controller buffer (WCB) unit 502. The stored whitened received signal 504 may represent an input into the JLLR demodulator unit 404 from FIG. 4. Another input in the demapper 406 may be a matrix 506 of MIMO channel coefficients, and yet another input may be a priori LLRs 508 from the Turbo decoder 420 from FIG. 4. The JLLR demodulator unit 404 from FIG. 4 may generate a posteriori LLRs 510 of transmitted coded bits. Extrinsic LLRs 512 may be obtained by subtracting the a priori LLRs 508 from the a posteriori LLRs 510.

The system model may be represented as:

$$y = H \cdot x + n, \quad (1)$$

where x is a vector of transmitted symbols from one or more transmit antennas, y is the whitened signal 504, H is the matrix 506 of channel coefficients, and n is a noise vector. It can be assumed a MIMO wireless system, while a single stream wireless system and a single-input single-output (SISO) wireless system may be considered as special cases of the MIMO wireless system.

The LLR output 510 for the bit $b_k$ from the vector of transmitted modulated symbols x may be written as:

$$L(b_k) = LLR(b_k \mid y) = \log\left(\frac{P(b_k = 0 \mid y)}{P(b_k = 1 \mid y)}\right) = \log\left(\frac{\sum_{x:b_k=0} P(x \mid y)}{\sum_{x:b_k=1} P(x \mid y)}\right) \quad (2)$$

$$= \log\left(\frac{\sum_{x:b_k=0} p(y \mid x)P(x)}{\sum_{x:b_k=1} p(y \mid x)P(x)}\right)$$

$$= \log\left(\frac{\sum_{x:b_k=0} p(y \mid x)P(b_k=0)\prod_{i=1,i\neq k}^{N\cdot M} P(b_i=u_i)}{\sum_{x:b_k=1} p(y \mid x)P(b_k=1)\prod_{j=1,j\neq k}^{N\cdot M} P(b_j=v_j)}\right)$$

$$= \underbrace{\log\left(\frac{\sum_{x:b_k=0} p(y \mid x)\prod_{i=1,i\neq k}^{N\cdot M} P(b_i=u_i)}{\sum_{x:b_k=1} p(y \mid x)\prod_{j=1,j\neq k}^{N\cdot M} P(b_j=v_j)}\right)}_{Extrinsic} + \underbrace{\log\left(\frac{P(b_k=0)}{P(b_k=1)}\right)}_{APP}$$

$$= L_E(b_k) + L_A(b_k),$$

where $L(b_k)$ represents the a posteriori LLR output 510 of the demodulator, $L_A(b_k)$ is the a priori probability (APP) LLR input 508 to the demodulator, $L_E(b_k)$ is the extrinsic LLR output 512 of the demodulator, N is a number of transmitted MIMO data streams, and M is a number of bits per modulation symbol. Variables $u_i$ and $v_j$ may be either 0 or 1, depending on the symbol vector x and the symbol-bit mapping relation. In addition, according to the definition of LLRs, the a priori probabilities may be written as:

$$P(b_i = 1) = \frac{1}{1 + \exp(L_A(b_i))}, \quad (3)$$

$$P(b_i = 0) = \frac{\exp(L_A(b_i))}{1 + \exp(L_A(b_i))}.$$

It can be observed from equation (2) that the a posteriori LLR output of the demodulator may be composed of two parts, the APP information and the extrinsic information. After combining equation (3) with equation (2), the extrinsic LLR for the bit $b_k$ may be written as:

$$L_E(b_k) = \log\left(\frac{\sum_{x:b_k=0} p(y \mid x)\exp\left(\sum_{i=1,i\neq k,b_i=0}^{N\cdot M} L_A(b_i)\right)}{\sum_{x:b_k=1} p(y \mid x)\exp\left(\sum_{j=1,j\neq k,b_j=0}^{N\cdot M} L_A(b_j)\right)}\right) \quad (4)$$

$$= \log\left(\frac{\sum_{x:b_k=0} \exp\left(-\frac{\|y-Hx\|^2}{\sigma_n^2} + \sum_{i=1,i\neq k,b_i=0}^{N\cdot M} L_A(b_i)\right)}{\sum_{x:b_k=1} \exp\left(-\frac{\|y-Hx\|^2}{\sigma_n^2} + \sum_{j=1,j\neq k,b_j=0}^{N\cdot M} L_A(b_j)\right)}\right),$$

where $\sigma_n^2$ is a noise variance.

It can be observed from equation (4) that each term that represents a distance between a received symbol y and a transmitted hypothesis x may be shifted by adding APP LLRs. In addition, conversion of the APP LLRs into probabilities may not be required when utilizing the APP information.

The Max-Log MAP (MLM) solution may be obtained by replacing the sum operation in equation (4) by a maximum operation, as given by:

$$L_E(b_k) = \log\left(\frac{\sum_{x:b_k=0} \exp\left(-\frac{\|y-Hx\|^2}{\sigma_n^2} + \sum_{i=1,i\neq k,b_i=0}^{N\cdot M} L_A(b_i)\right)}{\sum_{x:b_k=1} \exp\left(-\frac{\|y-Hx\|^2}{\sigma_n^2} + \sum_{j=1,j\neq k,b_j=0}^{N\cdot M} L_A(b_j)\right)}\right) \quad (5)$$

$$\overset{MLM}{\approx} \log\left(\frac{\max_{x:b_k=0} \exp\left(-\frac{\|y-Hx\|^2}{\sigma_n^2} + \sum_{i=1,i\neq k,b_i=0}^{N\cdot M} L_A(b_i)\right)}{\max_{x:b_k=1} \exp\left(-\frac{\|y-Hx\|^2}{\sigma_n^2} + \sum_{j=1,j\neq k,b_j=0}^{N\cdot M} L_A(b_j)\right)}\right)$$

$$= \max_{x:b_k=0}\left(-\frac{\|y-Hx\|^2}{\sigma_n^2} + \sum_{i=1,i\neq k,b_i=0}^{N\cdot M} L_A(b_i)\right) -$$

$$\max_{x:b_k=1}\left(-\frac{\|y-Hx\|^2}{\sigma_n^2} + \sum_{j=1,j\neq k,b_j=0}^{N\cdot M} L_A(b_j)\right).$$

Iterative Decoding with HARQ Combining

Figure 6:
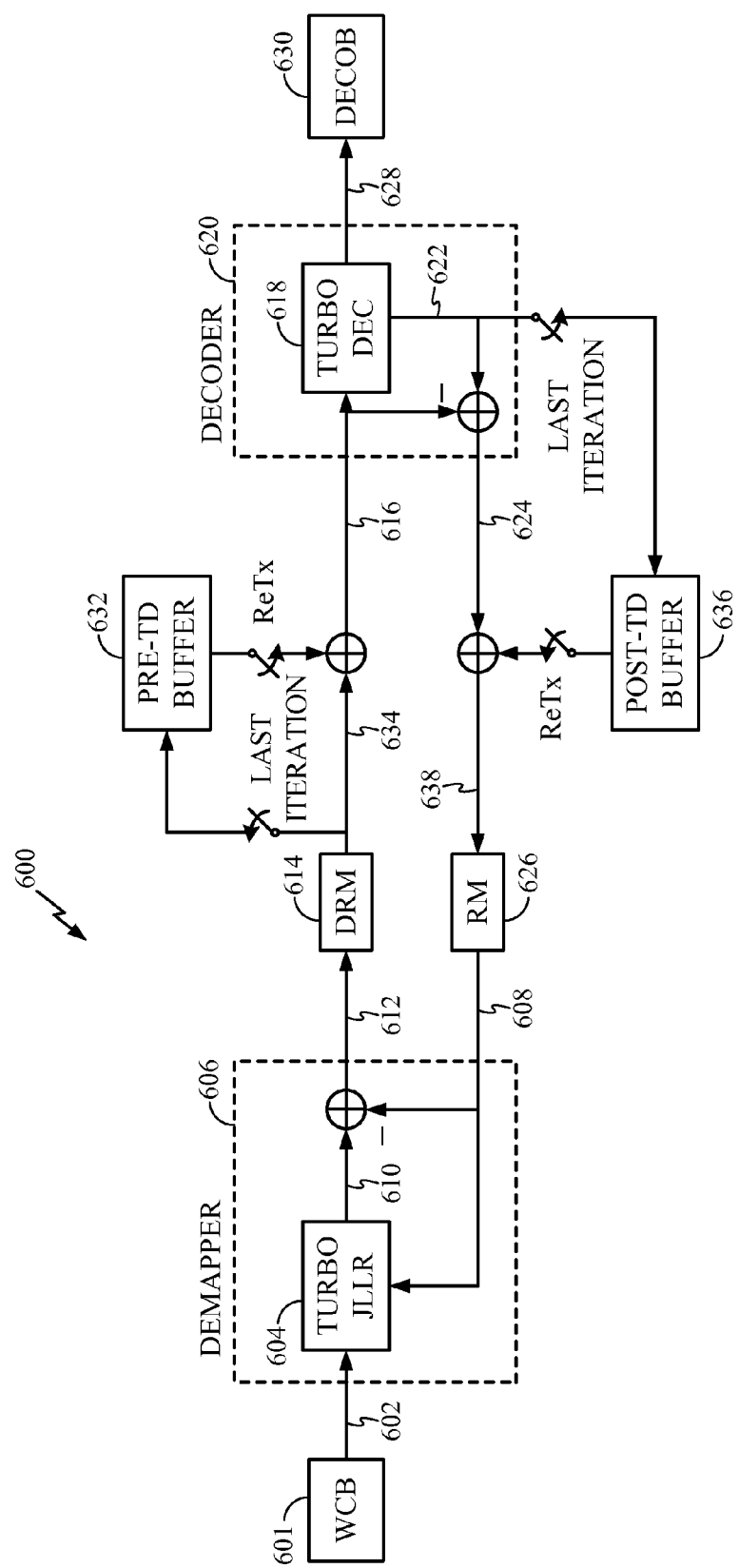
FIG. 6 illustrates an example iterative receiver with Hybrid Automatic Repeat Request (HARQ) combining in accordance with certain aspects of the present disclosure.

FIG. 6 illustrates an example iterative receiver 600 with Hybrid Automatic Repeat Request (HARQ) combining in accordance with certain aspects of the present disclosure. It can be observed that the receiver 600 is based on the iterative receiver 400 from FIG. 4, where a pre-Turbo decoding (pre-TD) buffer 632 and a post-TD buffer 636 may be incorporated to efficiently support re-transmission of data in the case when the decoding is not successful.

For the first transmission of data, a structure and processing path may be identical as the structure 400 illustrated in FIG. 4. In particular, an extrinsic log-likelihood ratio (LLR) output 624 from a Turbo decoder 620 may become an a priori probability (APP) input 608 for a demapper 606 and for a Turbo JLLR unit 604 for the next processing iteration. Similarly, an extrinsic LLR output 612 from a demapper 606 may become an APP input 616 for the Turbo decoder 620 and for a Turbo decoding unit 618.

At the last outer iteration between the demapper 606 and the Turbo decoder 620 of the first data transmission, the extrinsic LLR output 634 from the demapper 606 after being processed by a de-rate matching (DRM) unit 614 may be stored in the pre-TD buffer 632. The stored LLRs may be utilized for possible HARQ combining during re-transmission of data in case when a cyclic redundancy check (CRC) at the output 628 of the Turbo decoder 620 fails after a defined number of outer iterations between the demapper 606 and the Turbo decoder 620. Also, the Turbo decoder output LLRs 622 may be stored in the post-TD buffer 636. The stored LLRs 622 may be then processed and used as APPs 608 for possible data re-transmission in the case when the CRC at the output 628 of the Turbo decoder 620 fails after the defined number of outer iterations of the first data transmission.

For the first iteration of the re-transmission, the LLRs 622 from the previous transmission stored in the post-TD buffer 636 may be directly utilized as APPs for the current re-transmission. On the other hand, the extrinsic LLR output 634 from the demapper 606 may be combined with the LLRs stored in the pre-TD buffer 632 (i.e., the LLRs saved during the previous transmission) as a part of the HARQ combining process. The output LLRs 616 may be then fed into the Turbo decoder 620.

For the next iteration of the re-transmission, the extrinsic LLRs 624 from the Turbo decoder 620 may be first combined with the post-TD LLRs computed and stored during the previous data transmission. The combined LLRs 638 may be processed by a rate-matching (RM) unit 626 and then utilized as APPs 608. The extrinsic output LLRs 634 from the demapper 606 may be combined with the LLRs stored in the pre-TD buffer 632, and then fed again into the Turbo decoder 620.

Figure 7:
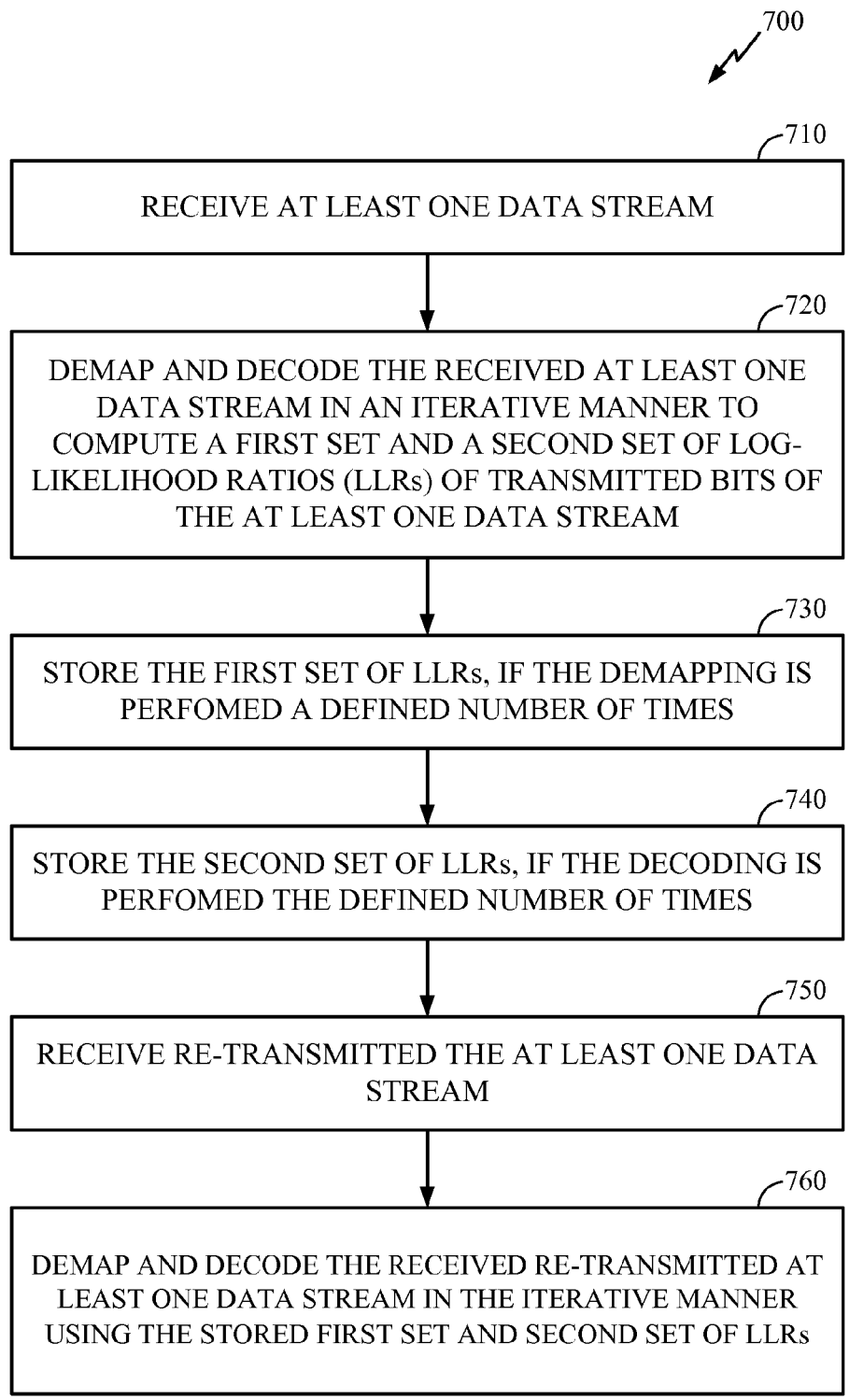
FIG. 7 illustrates example operations for iterative decoding with HARQ combining in accordance with certain aspects of the present disclosure.

FIG. 7 summarizes example operations 700 for iterative decoding with HARQ combining in accordance with certain aspects of the present disclosure. At 710, at least one data stream may be received. At 720, de-mapping and decoding of the received at least one data stream may be performed in an iterative manner. During the iterative process, a first set of LLRs of transmitted bits of the at least one data stream may be computed after each de-mapping step, while a second set of LLRs of the transmitted bits of the at least one data stream may be computed after each decoding step.

At 730, the computed first set of LLRs may be saved for the next re-transmission of data, if the de-mapping has been performed a defined number of times. At 740, the computed second set of LLRs may be saved for the next data re-transmission, if the decoding has been performed the defined number of times. At 750, re-transmitted at least one data stream may be received. At 760, de-mapping and decoding of the received re-transmitted at least one data stream may be performed in the iterative manner using the stored first and second set of LLRs.

Figure 8:
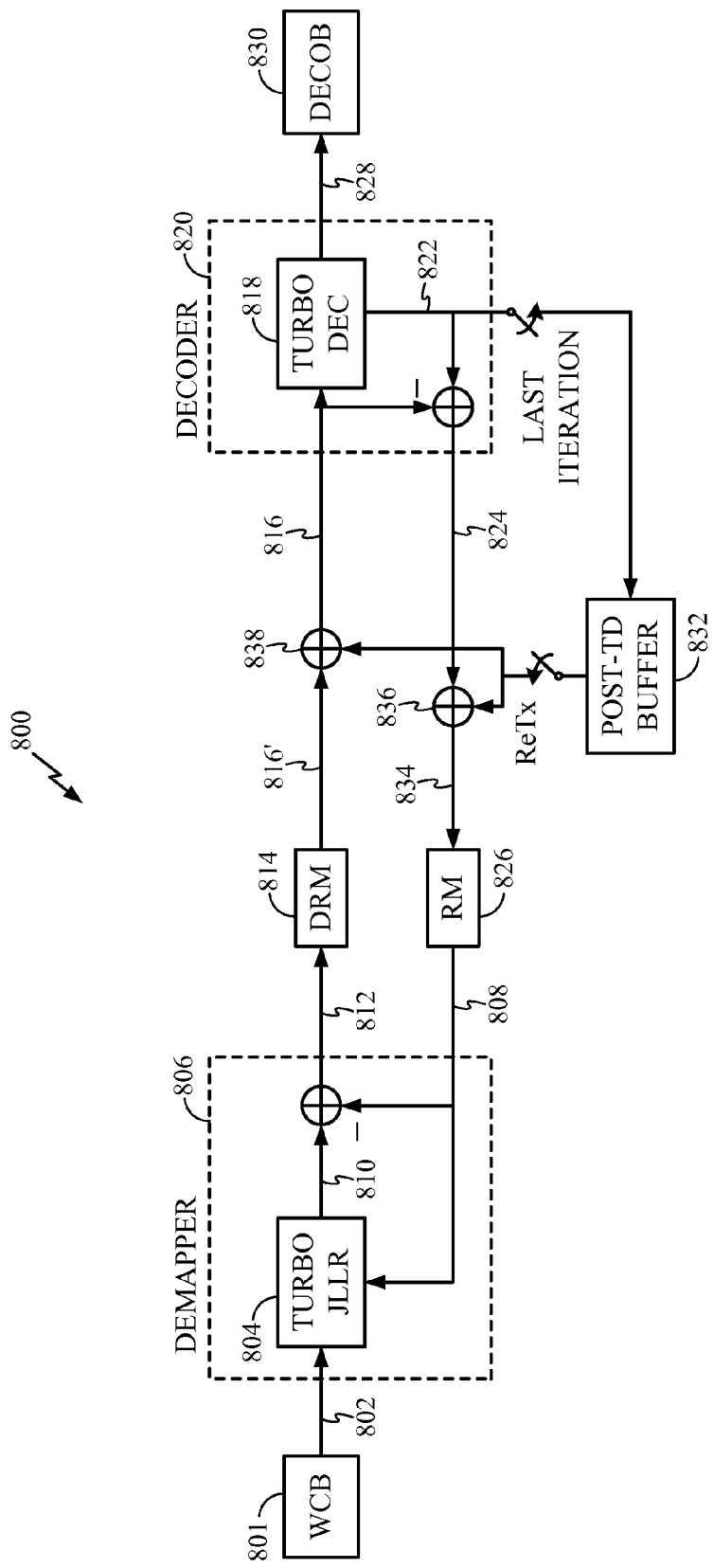
FIG. 8 illustrates an example iterative receiver with HARQ combining with reduced memory requirements in accordance with certain aspects of the present disclosure.

FIG. 8 illustrates another example of iterative receiver with HARQ combining in accordance with certain aspects of the present disclosure. The iterative receiver structure 800 may be utilized when considering HARQ with the purpose of saving a memory for storing LLRs from one data transmission to another. It can be observed from FIG. 8 that those LLRs 822 stored in the post-TD buffer 832 at the output of the Turbo decoder 820 may be used for both APP combining and for HARQ combining, as illustrated in FIG. 8 by adders 836 and 838, respectively. Therefore, the pre-TD buffer may not be required for HARQ combining In order to further save the memory, the post-TD buffer 832 may be utilized to save only systematic LLRs instead of all output LLRs 822 from the Turbo decoder 820.

Soft Decision Directed Channel Estimation for Iterative Receiver

Figure 9:
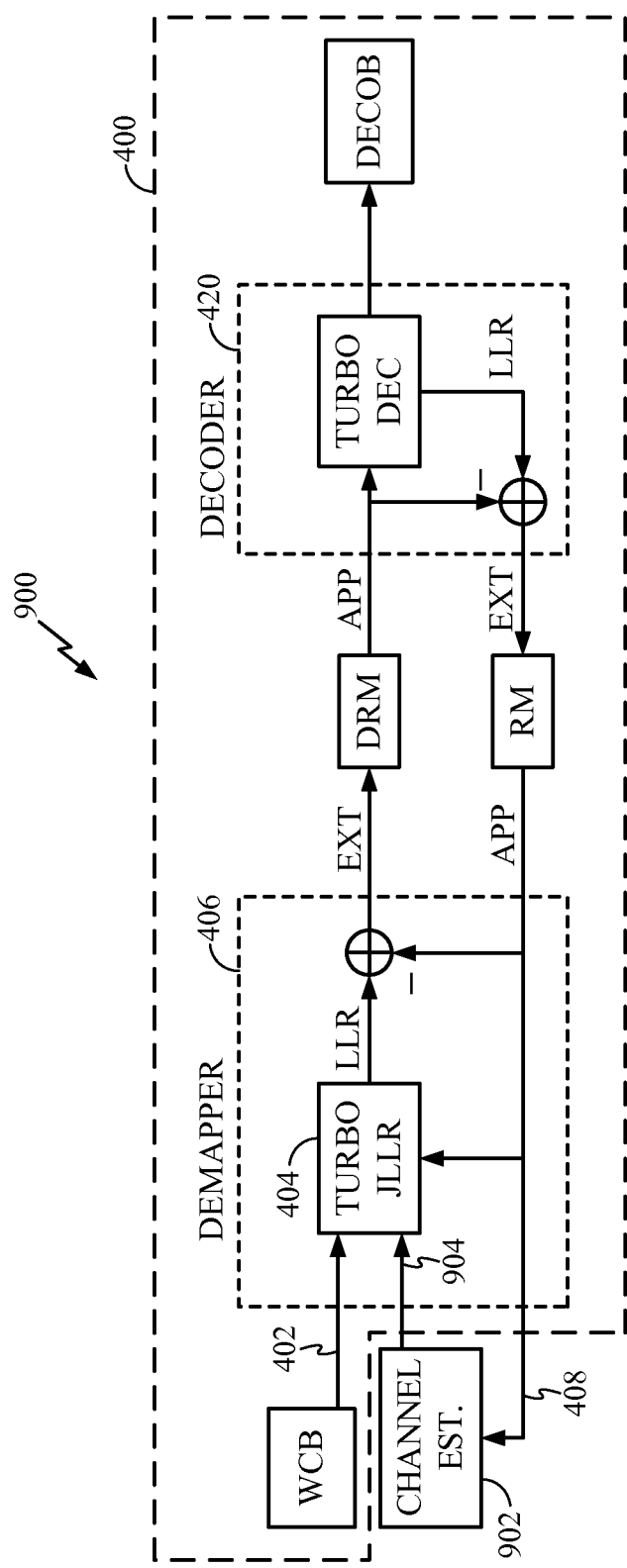
FIG. 9 illustrates an example iterative receiver with soft decision directed channel estimation in accordance with certain aspects of the present disclosure.

Certain aspects of the present disclosure support a soft decision directed channel estimation for the iterative receiver 400 from FIG. 4. FIG. 9 illustrates an example iterative receiver 900 with soft decision directed channel estimation in accordance with certain aspects of the present disclosure. The receiver structure 900 may comprise the iterative receiver structure 400 from FIG. 4 and a channel estimation block 902.

For each data transmission, initial channel estimation may be obtained by processing a pilot signal transmitted over a pilot channel. In addition, at each iteration between the demapper 406 and the Turbo decoder 420 of the receiver 400, rate-matched extrinsic LLRs 408 from the output of Turbo decoder 420 may be utilized to refine initial channel estimates. As illustrated in FIG. 9, the refined channel estimates 904 may be used in the next processing iteration by the Turbo JLLR 404 along with the received samples 402.

Figure 10:
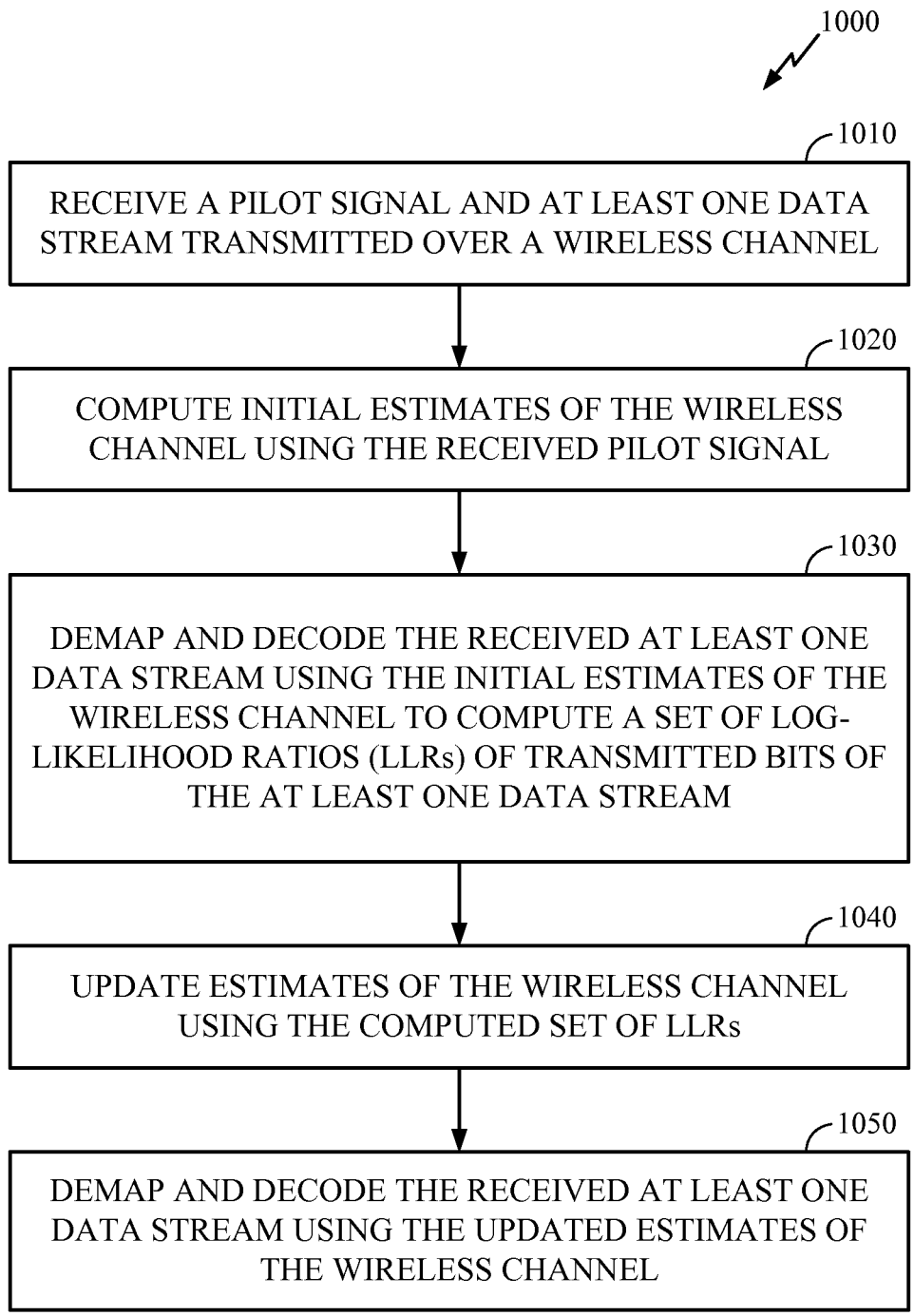
FIG. 10 illustrates example operations for iterative decoding with soft decision directed channel estimation in accordance with certain aspects of the present disclosure.

FIG. 10 illustrates example operations 1000 for iterative decoding with soft decision directed channel estimation in accordance with certain aspects of the present disclosure. At 1010, a pilot signal and at least one data stream transmitted over a wireless channel may be received. At 1020, initial estimates of the wireless channel may be computed using the received pilot signal. At 1030, de-mapping and decoding of the at least one data stream may be performed using the computed initial estimates of the wireless channel, and a set of LLRs of transmitted bits of the at least one data stream may be computed during this process. At 1040, estimates of the wireless channel may be updated using the computed set of LLRs and the previously computed initial channel estimates. At 1050, de-mapping and decoding of the at least one data stream may be now performed using the updated estimates of the wireless channel. The process of updating the channel estimates may be repeated after de-mapping and decoding a defined number of times.

The soft decision directed channel estimation 902 is described below in greater detail. A MIMO-OFDM wireless system may be considered with M transmit antennas and N receive antennas. The total number of frequency tones (i.e., subcarriers) is denoted by K. The received signal at the arbitrary $k^{th}$ tone $y_k$ may be expressed as:

$$y_k = H_k x_k + n_k, \quad k=1,2,\ldots,K, \qquad (6)$$

where $y_k \in C^{N \times 1}$, $H_k \in C^{N \times M}$ is a MIMO channel matrix associated with the $k^{th}$ tone, $x_k \in C^{M \times 1}$ represents transmitted symbols from all M transmit antennas at the $k^{th}$ tone, and $n_k \in C^{N \times 1}$ is a noise vector at the $k^{th}$ tone. Let $h_{k,i} \in C^{1 \times M}$, $i \in 1, 2, \ldots, N$ denotes the $i^{th}$ row of the MIMO channel matrix $H_k$. Then, equation (6) may be re-written as:

$$y_k = X_k \cdot h_k + n_k, \qquad (7)$$

where $$X_k = \begin{bmatrix} x_k^T & 0 & \cdots & 0 \\ 0 & x_k^T & \cdots & 0 \\ \vdots & \vdots & \ddots & \vdots \\ 0 & 0 & \cdots & x_k^T \end{bmatrix}_{N \times M \cdot N}, \qquad (8)$$

and $$h_k = [\, h_{k,1} \quad h_{k,2} \quad \cdots \quad h_{k,N} \,]^T. \qquad (9)$$

If all the K tones are grouped together in a matrix form, then equation (7) may be written as:

$$y = X \cdot h + n, \quad (10)$$

where $$y = [\, y_1^T \quad y_2^T \quad \cdots \quad y_K^T \,]^T, \quad (11)$$

$$h = [\, h_1^T \quad h_2^T \quad \cdots \quad h_K^T \,]^T, \quad (12)$$

$$n = [\, n_1^T \quad n_2^T \quad \cdots \quad n_K^T \,]^T, \quad (13)$$

and $$X = \begin{bmatrix} X_1 & 0 & \cdots & 0 \\ 0 & X_2 & \cdots & 0 \\ \vdots & \vdots & \ddots & \vdots \\ 0 & 0 & \cdots & X_K \end{bmatrix}. \quad (14)$$

It can be noted that among the K tones, a portion of them may be training sequence used for channel estimation, while the rest may be used for actual data transmission. Let $X_t$ denotes the training portion of X constructed by removing all rows of X containing data, and $y_t$ denotes the pilot tones among the received signal y. Then, the following may be written:

$$y_t = X_t \cdot h + n_t. \quad (15)$$

For each transmitted sub-frame, the channel may be first estimated via the pilot channel using the received pilot signal. After the Turbo decoding is performed, the output soft LLR information on data tones may be utilized as extra information to refine the pilot-based channel estimates.

It can be assumed that $E\{h\}=0$. The linear minimum mean square error (LMMSE) channel estimator may be expressed as:

$$\hat{h} = A \cdot y_t. \quad (16)$$

By solving $$E\{(\hat{h}-h)\cdot y_t^H\}=0, \quad (17)$$

the LMMSE channel estimates may be obtained as:

$$\hat{h} = \underbrace{R_h X_t^H (X_t R_h X_t^H + R_{n_t})^{-1}}_{A} \cdot y_t, \quad (18)$$

where $R_h$ and $R_{n_t}$ are cross-correlation terms related to the channel vector h and to the noise vector $n_t$. In addition, equation (18) may be written according to the matrix inversion lemma as:

$$\hat{h} = (X_t^H R_{n_t}^{-1} X_t + R_h^{-1})^{-1} X_t^H R_{n_t}^{-1} y_t. \quad (19)$$

Equation (18) may have the computational advantage over equation (19) since the dimension of matrix inversion in the former may be in general smaller than the dimension of matrix inversion in the latter. As described later in greater detail, the pilot-based channel estimation obtained as in equation (18) may be set as the initial mean value in the following iterations, if an affine soft decision directed channel estimator is employed.

It can be noted from both equation (18) and equation (19) that:

$$E\{\hat{h}\}=0. \quad (20)$$

Thus, the covariance of the LMMSE channel estimator defined by equation (18) may be derived as:

$$Cov(\hat{h}) = E\{\hat{h}\hat{h}^H\} = A X_t R_h^H. \quad (21)$$

Finally, the following may hold:

$$E\{(\hat{h}-h)(\hat{h}-h)^H\} = A X_t R_h^H + R_h - 2Re\{A X_t R_h\}. \quad (22)$$

In the following iterations, the covariance matrix given by equation (21) may be set as the initial covariance matrix in the case when the affine soft decision directed channel estimator is utilized.

Certain aspects of the present disclosure support a linear soft decision directed channel estimation. This channel estimator may be written in the form:

$$\hat{h} = B \cdot y. \quad (23)$$

It can be still assumed that $E\{h\}=0$ for the iterative channel estimation process. The extrinsic LLRs obtained from the Turbo decoder may be utilized to construct soft symbols. The expectation $\bar{s}_{k,m}$ and a variance $\sigma_{k,m}^2$ of a soft symbol corresponding to the arbitrary $k^{th}$ (k=1, ..., K) tone and the arbitrary $m^{th}$ (m=1, ..., M) transmit antenna may be readily obtained, while Gaussian approximation may be also used.

Let $$X = \bar{X} + \tilde{X}, \quad (24)$$

where $\bar{X}$ represents the expectation of X, and $$E\{\tilde{X}^H \tilde{X}\} = \tilde{R} \quad (25)$$

is a diagonal matrix. For pilot tones, the diagonal terms of matrix $\tilde{R}$ may be equal to zero, and for data tones the diagonal terms may be equal to $\sigma_{k,m}^2$. Therefore, the following may hold:

$$y = Xh + n \quad (26)$$

$$= \bar{X}h + \underbrace{(\tilde{X}h + n)}_{z}.$$

It can be assumed that:

$$z \sim CN(0, R_z), \quad (27)$$

where $R_z$ is a diagonal matrix. Then, the corresponding diagonal terms for pilot tones may be equal to zero, while the diagonal terms may be equal to $\sigma_z^2$ for data tones. Under this assumption, the following may be obtained:

$$\sigma_z^2 = \frac{1}{K} E\{z^H z\} \quad (28)$$

$$= \frac{1}{K} E\{tr[\tilde{X} h h^H \tilde{X}^H]\}$$

$$= \frac{1}{K} tr[R_h \tilde{R}].$$

Thus, the linear soft decision directed channel estimator may be derived as:

$$\hat{h} \approx \underbrace{R_h \bar{X}^H (\bar{X} R_h \bar{X}^H + R_n + R_z)^{-1}}_{B} \cdot y. \quad (29)$$

It should be noted that for the OFDM system, elements of h (i.e., channel taps) may be strongly correlated implying that the approximation of $R_z$ being diagonal may not be accurate. A simplified version of the estimator given by equation (29) may just ignore the term $R_z$.

Certain aspects of the present disclosure support the affine soft decision directed channel estimation. The affine channel estimator may have the form of:

$$\hat{h} = Cy + \bar{h}, \quad (30)$$

where a mean of the affine channel estimator may be set as the mean of the pilot-based LMMSE channel estimator given by equation (18). The system model may be written as:

$$\begin{aligned} y &= Xh + n \\ &= (\bar{X} + \tilde{X}) \cdot (\bar{h} + \tilde{h}) + n \\ &= \bar{X} \cdot \bar{h} + \bar{X} \cdot \tilde{h} + \tilde{X} \cdot \bar{h} + \tilde{X} \cdot \tilde{h} + n \\ &= \bar{X} \cdot \bar{h} + \bar{X} \cdot \tilde{h} + \bar{H} \cdot \tilde{x} + \underbrace{\tilde{X} \cdot \tilde{h}}_{z} + n, \end{aligned} \quad (31)$$

where $$H = \begin{bmatrix} \bar{H}_1 & 0 & \cdots & 0 \\ 0 & \bar{H}_2 & \cdots & 0 \\ \vdots & \vdots & \ddots & \vdots \\ 0 & 0 & \cdots & \bar{H}_K \end{bmatrix}, \quad (32)$$

and $$\tilde{x} = [\tilde{x}_1^T \ \tilde{x}_2^T \ \ldots \ \tilde{x}_K^T]^T. \quad (33)$$

The affine soft decision directed channel estimator may be expressed as:

$$\hat{h} \approx \underbrace{R_{\tilde{h}} \bar{X}^H (\bar{X} R_{\tilde{h}} \bar{X}^H + \bar{H} R_{\tilde{x}} \bar{H}^H + R_{\tilde{z}} + R_n)^{-1}}_{C} \cdot (y - \bar{X} \cdot \bar{h}) + \bar{h}, \quad (34)$$

where $R_{\tilde{z}}$ is defined similar to $R_z$ with:

$$\sigma_{\tilde{z}}^2 = \frac{1}{K} tr[R_{\tilde{h}} \tilde{R}]. \quad (35)$$

It can be noted that the assumption that $R_{\tilde{z}}$ is a diagonal matrix is reasonable since elements of $\tilde{h}$ may not be strongly correlated. A simplified version of the affine estimator given by equation (34) may ignore either or both of the terms $R_{\tilde{z}}$ and $\bar{H} R_{\tilde{x}} \bar{H}^H$ from equation (34). Also, it can be shown that:

$$E\{\hat{h}\} = \bar{h}, \quad (36)$$

and $$Cov(\hat{h}) = C \cdot \bar{X} \cdot K_{\tilde{h}}^H. \quad (37)$$

In equation (34), an initial value of $R_{\tilde{h}}$ may be set to the value given by equation (22), which is obtained from the pilot-based channel estimation. In the following iterations, the $R_{\tilde{h}}$ term may be approximated by using equation (37).

Figure 7A:
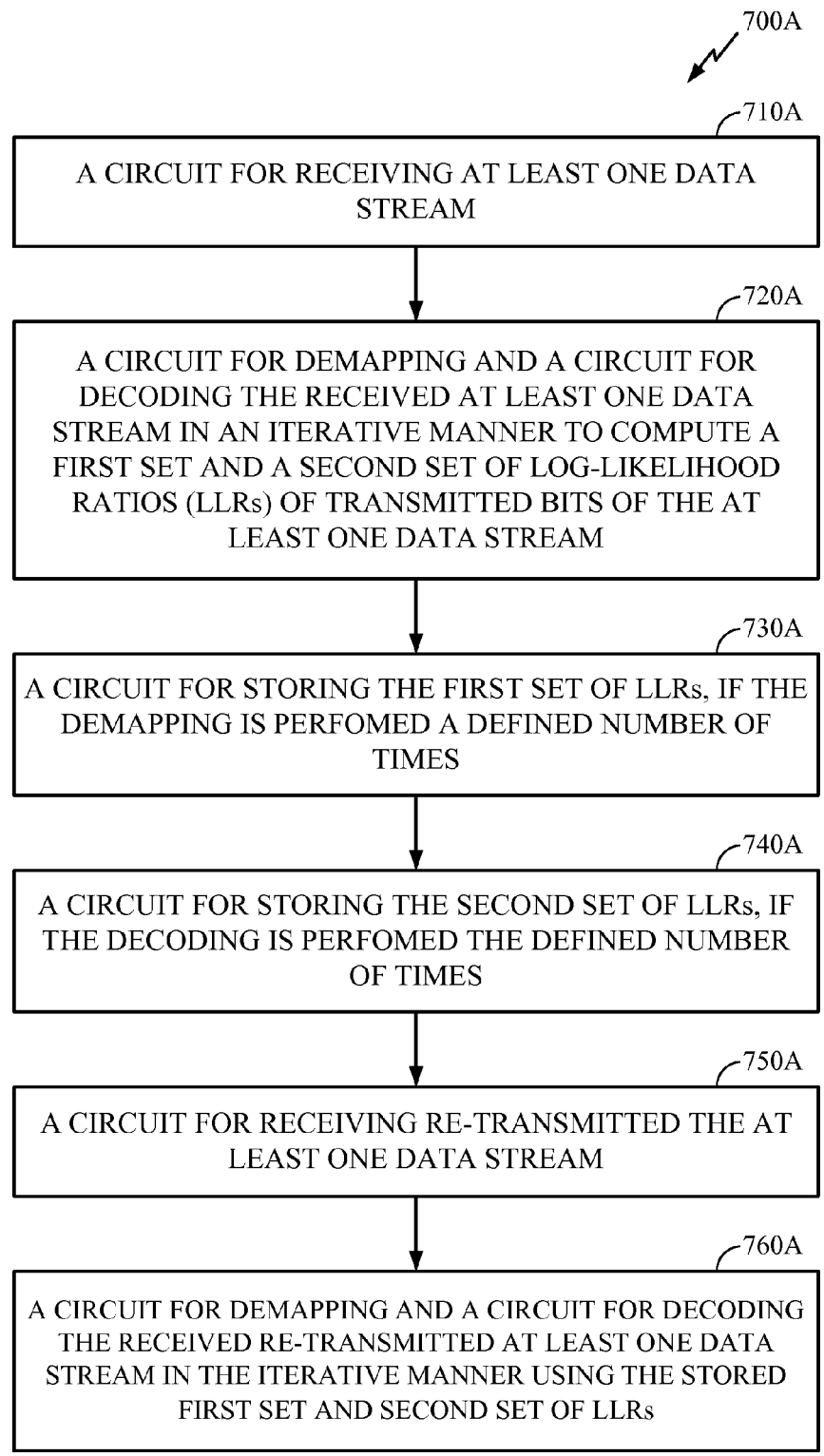
FIG. 7A illustrates example components capable of performing the operations illustrated in FIG. 7.
Figure 10A:
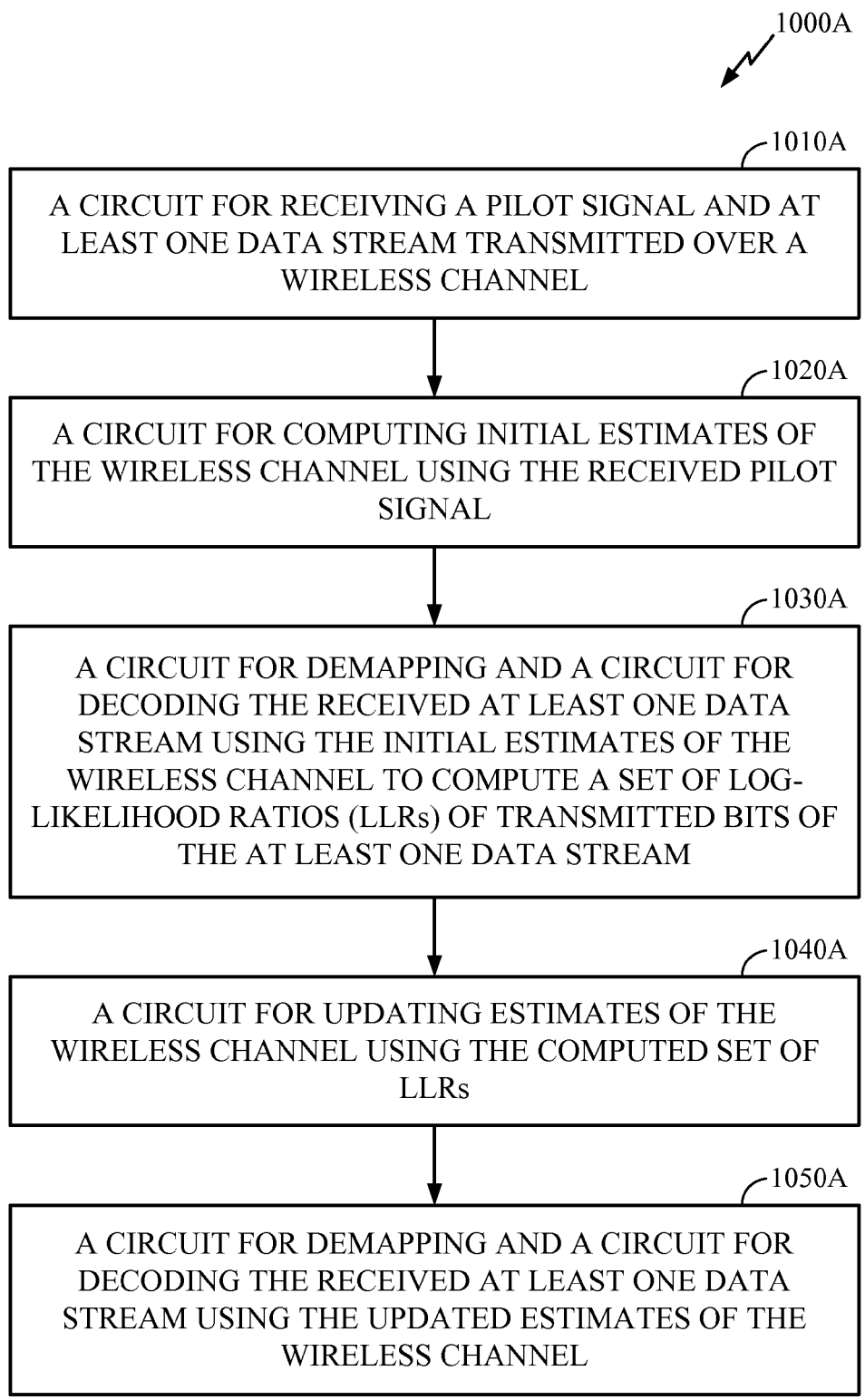
FIG. 10A illustrates example components capable of performing the operations illustrated in FIG. 10.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, blocks 710-760 and 1010-1050 illustrated in FIGS. 7 and 10 correspond to circuit blocks 710A-760A and 1010A-1050A illustrated in FIGS. 7A and 10A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The techniques provided herein may be utilized in a variety of applications. For certain aspects, the techniques presented herein may be incorporated in an access point station, an access terminal, or other type of wireless device with processing logic and elements to perform the techniques provided herein.

The invention claimed is:

1. A method for wireless communications, comprising:
   receiving at least one data stream;
   de-mapping and decoding the received data stream in an iterative manner to compute a posteriori log-likelihood ratios (LLRs) of bits of the received data stream;
   storing the computed a posteriori LLRs, if the decoding is performed in the iterative manner a defined number of times;
   receiving re-transmitted the data stream; and
   de-mapping and decoding the received re-transmitted data stream in the iterative manner using the stored set of LLRs.

2. The method of claim 1, wherein de-mapping and decoding the received data stream comprises:
   computing, as a result of the de-mapping the received data stream, extrinsic LLRs of the bits of the received data stream; and
   de-rate matching and storing the computed extrinsic LLRs, if the de-mapping of the received data stream is performed in the iterative manner the defined number of times.

3. The method of claim 2, wherein de-mapping and decoding the received re-transmitted data stream comprises:
   computing, as a result of the de-mapping the received re-transmitted data stream, a first set of extrinsic LLRs of bits of the re-transmitted data stream;
   de-rate matching the computed first set of extrinsic LLRs; and
   combining the de-rate matched first set of extrinsic LLRs and the stored extrinsic LLRs to generate input LLRs for the decoding of the re-transmitted data stream.

4. The method of claim 3, wherein de-mapping and decoding the received re-transmitted data stream further comprises:
   decoding the received re-transmitted data stream using the generated input LLRs to obtain a second set of extrinsic LLRs of the bits of the re-transmitted data stream;
   combining the second set of extrinsic LLRs and the stored a posteriori LLRs to obtain combined LLRs, wherein the a posteriori LLRs are computed as a result of the decoding of the received data stream;
   obtaining a priori probability (APP) LLRs of the bits of the re-transmitted data stream by rate matching the combined LLRs; and
   using the APP LLRs for the de-mapping of the re-transmitted data stream.

5. The method of claim 1, further comprising:
   rate matching the stored a posteriori LLRs, wherein the a posteriori LLRs are computed as a result of the decoding of the received data stream; and
   using, during a first iteration between the de-mapping and decoding of the received re-transmitted data stream, the rate matched LLRs as a priori probability (APP) LLRs of bits of the re-transmitted data stream for the de-mapping of the re-transmitted data stream.

6. The method of claim 1, wherein de-mapping and decoding the received re-transmitted data stream comprises:
   computing, as a result of the de-mapping the received re-transmitted data stream, a first set of extrinsic LLRs of bits of the re-transmitted data stream;
   combining de-rate matched version of the first set of extrinsic LLRs and the stored a posteriori LLRs to generate input LLRs for the decoding of the re-transmitted data stream, wherein the a posteriori LLRs are computed as a result of the decoding of the received data stream;
   decoding the received re-transmitted data stream using the generated input LLRs to obtain a second set of extrinsic LLRs of the bits of the re-transmitted data stream;
   combining the second set of extrinsic LLRs and the stored a posteriori LLRs to obtain combined LLRs;
   computing a priori probability (APP) LLRs of the bits of the re-transmitted data stream by rate matching the combined LLRs; and
   using the computed APP LLRs for the de-mapping of the received re-transmitted data stream.

7. The method of claim 6, wherein the stored a posteriori LLRs comprise only systematic LLRs associated with a systematic portion of the received data stream.

8. An apparatus for wireless communications, comprising:
a receiver configured to receive at least one data stream;
a de-mapper and a decoder configured to de-map and decode the received data stream in an iterative manner to compute a posteriori log-likelihood ratios (LLRs) of bits of the received data stream; and
a buffer configured to store the computed a posteriori LLRs, if the decoding is performed in the iterative manner a defined number of times,
wherein the receiver is also configured to receive re-transmitted data stream, and
wherein the de-mapper and the decoder are also configured to de-map and decode the received re-transmitted data stream in the iterative manner using the stored set of LLRs.

9. The apparatus of claim 8, wherein the de-mapper and the decoder configured to de-map and decode the received data stream comprises:
a computer configured to compute, as a result of the de-mapping the received data stream, extrinsic LLRs of the bits of the received data stream; and
a circuit configured to de-rate match and store the computed extrinsic LLRs, if the de-mapping of the received data stream is performed in the iterative manner the defined number of times.

10. The apparatus of claim 9, wherein the de-mapper and the decoder configured to de-map and decode the received re-transmitted data stream comprises:
a processor configured to compute, as a result of the de-mapping the received re-transmitted data stream, a first set of extrinsic LLRs of bits of the re-transmitted data stream;
a de-rate matching circuit configured to de-rate match the computed first set of extrinsic LLRs; and a
combiner configured to combine the de-rate matched first set of extrinsic LLRs and the stored extrinsic LLRs to generate input LLRs for the decoding of the re-transmitted data stream.

11. The apparatus of claim 10, wherein the de-mapper and the decoder configured to de-map and decode the received re-transmitted data stream further comprises:
a decoder configured to decode the received re-transmitted data stream using the generated input LLRs to obtain a second set of extrinsic LLRs of the bits of the re-transmitted data stream;
another combiner configured to combine the second set of extrinsic LLRs and the stored a posteriori LLRs to obtain combined LLRs, wherein the a posteriori LLRs are computed as a result of the decoding of the received data stream; and
a rate matching circuit configured to obtain a priori probability (APP) LLRs of the bits of the re-transmitted data stream by rate matching the combined LLRs, wherein the demapper is also configured to use the APP LLRs for the de-mapping of the re-transmitted data stream.

12. The apparatus of claim 8, further comprising:
a rate matching circuit configured to rate match the stored a posteriori LLRs, wherein the a posteriori LLRs are computed as a result of the decoding of the received data stream,
wherein the de-mapper is also configured to use, during a first iteration between the de-mapping and decoding of the received re-transmitted data stream, the rate matched LLRs as a priori probability (APP) LLRs of bits of the re-transmitted data stream for the de-mapping of the re-transmitted data stream.

13. The apparatus of claim 8, wherein the de-mapper and the decoder configured to de-map and decode the received re-transmitted data stream comprises:
a computer configured to compute, as a result of the de-mapping the received re-transmitted data stream, a first set of extrinsic LLRs of bits of the re-transmitted data stream;
a combiner configured to combine de-rate matched version of the first set of extrinsic LLRs and the stored a posteriori LLRs to generate input LLRs for the decoding of the re-transmitted data stream, wherein the a posteriori LLRs are computed as a result of the decoding of the received data stream;
a decoder configured to decode the received re-transmitted data stream using the generated input LLRs to obtain a second set of extrinsic LLRs of the bits of the re-transmitted data stream;
another combiner configured to combine the second set of extrinsic LLRs and the stored a posteriori LLRs to obtain combined LLRs; and
a rate matching circuit configured to compute a priori probability (APP) LLRs of the bits of the re-transmitted data stream by rate matching the combined LLRs,
wherein the de-mapper is also configured to use the computed APP LLRs for the de-mapping of the received re-transmitted data stream.

14. The apparatus of claim 13, wherein the stored a posteriori LLRs comprise only systematic LLRs associated with a systematic portion of the received data stream.

15. An apparatus for wireless communications, comprising:
means for receiving at least one data stream;
means for de-mapping and decoding the received data stream in an iterative manner to compute a posteriori log-likelihood ratios (LLRs) of bits of the received data stream;
means for storing the computed a posteriori LLRs, if the decoding is performed in the iterative manner a defined number of times;
means for receiving re-transmitted the data stream; and
means for de-mapping and decoding the received re-transmitted data stream in the iterative manner using the stored set of LLRs.

16. The apparatus of claim 15, wherein the means for de-mapping and decoding the received data stream comprises:
means for computing, as a result of the de-mapping the received data stream, extrinsic LLRs of the bits of the received data stream; and
means for de-rate matching and storing the computed extrinsic LLRs, if the de-mapping of the received data stream is performed in the iterative manner the defined number of times.

17. The apparatus of claim 16, wherein the means for de-mapping and decoding the received re-transmitted data stream comprises:
means for computing, as a result of the de-mapping the received re-transmitted data stream, a first set of extrinsic LLRs of bits of the re-transmitted data stream;
means for de-rate matching the computed first set of extrinsic LLRs; and
means for combining the de-rate matched first set of extrinsic LLRs and the stored extrinsic LLRs to generate input LLRs for the decoding of the re-transmitted data stream.

18. The apparatus of claim 17, wherein the means for de-mapping and decoding the received re-transmitted data stream further comprises:
- means for decoding the received re-transmitted data stream using the generated input LLRs to obtain a second set of extrinsic LLRs of the bits of the re-transmitted data stream;
- means for combining the second set of extrinsic LLRs and the stored a posteriori LLRs to obtain combined LLRs, wherein the a posteriori LLRs are computed as a result of the decoding of the received data stream;
- means for obtaining a priori probability (APP) LLRs of the bits of the re-transmitted data stream by rate matching the combined LLRs; and
- means for using the APP LLRs for the de-mapping of the re-transmitted data stream.

19. The apparatus of claim 15, further comprising:
- means for rate matching the stored a posteriori LLRs, wherein the a posteriori LLRs are computed as a result of the decoding of the received data stream; and
- means for using, during a first iteration between the de-mapping and decoding of the received re-transmitted data stream, the rate matched LLRs as a priori probability (APP) LLRs of bits of the re-transmitted data stream for the de-mapping of the re-transmitted data stream.

20. The apparatus of claim 15, wherein the means for de-mapping and decoding the received re-transmitted data stream comprises:
- means for computing, as a result of the de-mapping the received re-transmitted data stream, a first set of extrinsic LLRs of bits of the re-transmitted data stream;
- means for combining de-rate matched version of the first set of extrinsic LLRs and the stored a posteriori LLRs to generate input LLRs for the decoding of the re-transmitted data stream, wherein the a posteriori LLRs are computed as a result of the decoding of the received data stream;
- means for decoding the received re-transmitted data stream using the generated input LLRs to obtain a second set of extrinsic LLRs of the bits of the re-transmitted data stream;
- means for combining the second set of extrinsic LLRs and the stored a posteriori LLRs to obtain combined LLRs;
- means for computing a priori probability (APP) LLRs of the bits of the re-transmitted data stream by rate matching the combined LLRs; and
- means for using the computed APP LLRs for the de-mapping of the received re-transmitted data stream.

21. The apparatus of claim 20, wherein the stored a posteriori LLRs comprise only systematic LLRs associated with a systematic portion of the received data stream.

22. A computer-program product for wireless communications, comprising a computer-readable medium comprising instructions executable to:
- receive at least one data stream;
- de-map and decode the received data stream in an iterative manner to compute a posteriori log-likelihood ratios (LLRs) of bits of the received data stream;
- store the computed a posteriori LLRs, if the decoding is performed in the iterative manner a defined number of times;
- receive re-transmitted data stream; and
- de-map and decode the received re-transmitted data stream in the iterative manner using the stored set of LLRs.

23. A wireless node, comprising:
- at least one antenna;
- a receiver configured to receive at least one data stream via the at least one antenna;
- a de-mapper and a decoder configured to de-map and decode the received data stream in an iterative manner to compute a posteriori log-likelihood ratios (LLRs) of bits of the received data stream; and a buffer configured to store the computed a posteriori LLRs, if the decoding is performed in the iterative manner a defined number of times,
- wherein the receiver is also configured to receive re-transmitted data stream via the at least one antenna, and
- wherein the de-mapper and the decoder are also configured to de-map and decode the received re-transmitted data stream in the iterative manner using the stored set of LLRs.

24. A method for wireless communications, comprising:
- receiving a pilot signal and at least one data stream transmitted over a wireless channel;
- computing initial estimates of the wireless channel using the received pilot signal;
- de-mapping, de-rate matching and decoding the received data stream using the computed initial estimates of the wireless channel to compute a set of log-likelihood ratios (LLRs) of transmitted bits of the data stream;
- updating estimates of the wireless channel using the computed set of LLRs and the computed initial estimates of the wireless channel; and
- de-mapping, de-rate matching and decoding the received data stream using the updated estimates of the wireless channel.

25. The method of claim 24, wherein the computed set of LLRs comprises extrinsic LLRs generated as a result of the decoding.

26. The method of claim 25, further comprising:
- rate-matching the extrinsic LLRs to obtain the computed set of LLRs.

27. The method of claim 24, wherein updating the estimates of the wireless channel comprises:
- obtaining hard symbols associated with the received data stream using the computed set of LLRs;
- obtaining soft symbols associated with the received data stream using the computed set of LLRs; and
- computing the estimates of the wireless channel using the obtained hard symbols and statistics of the obtained soft symbols.

28. The method of claim 24, wherein the estimates of the wireless channel are updated according to an affine soft decision directed channel estimation algorithm.

29. The method of claim 24, wherein the estimates of the wireless channel are updated according to a linear soft decision directed channel estimation algorithm.

30. An apparatus for wireless communications, comprising:
- a receiver configured to receive a pilot signal and at least one data stream transmitted over a wireless channel;
- an estimator configured to compute initial estimates of the wireless channel using the received pilot signal; and
- a de-mapper, a de-rate matching circuit and a decoder configured to de-map, de-rate match and decode the received data stream using the computed initial estimates of the wireless channel to compute a set of log-likelihood ratios (LLRs) of transmitted bits of the data stream,
- wherein the estimator is also configured to update estimates of the wireless channel using the computed set of LLRs and the computed initial estimates of the wireless channel, and wherein the de-mapper, the de-rate matching circuit and the decoder are also configured to de-map, de-rate match and decode the received data stream using the updated estimates of the wireless channel.

31. The apparatus of claim 30, wherein the computed set of LLRs comprises extrinsic LLRs generated as a result of the decoding.

32. The apparatus of claim 31, further comprising:
a rate matching circuit configured to rate-match the extrinsic LLRs to obtain the computed set of LLRs.

33. The apparatus of claim 30, wherein the estimator configured to update the estimates of the wireless channel comprises:
a processor configured to obtain hard symbols associated with the received data stream using the computed set of LLRs;
another processor configured to obtain soft symbols associated with the received data stream using the computed set of LLRs; and
a computer configured to compute the estimates of the wireless channel using the obtained hard symbols and statistics of the obtained soft symbols.

34. The apparatus of claim 30, wherein the estimates of the wireless channel are updated according to an affine soft decision directed channel estimation algorithm.

35. The apparatus of claim 30, wherein the estimates of the wireless channel are updated according to a linear soft decision directed channel estimation algorithm.

36. An apparatus for wireless communications, comprising:
means for receiving a pilot signal and at least one data stream transmitted over a wireless channel;
means for computing initial estimates of the wireless channel using the received pilot signal;
means for de-mapping, de-rate matching and decoding the received data stream using the computed initial estimates of the wireless channel to compute a set of log-likelihood ratios (LLRs) of transmitted bits of the data stream;
means for updating estimates of the wireless channel using the computed set of LLRs and the computed initial estimates of the wireless channel; and
means for de-mapping, de-rate matching and decoding the received data stream using the updated estimates of the wireless channel.

37. The apparatus of claim 36, wherein the computed set of LLRs comprises extrinsic LLRs generated as a result of the decoding.

38. The apparatus of claim 37, further comprising:
means for rate-matching the extrinsic LLRs to obtain the computed set of LLRs.

39. The apparatus of claim 36, wherein the means for updating the estimates of the wireless channel comprises:
means for obtaining hard symbols associated with the received data stream using the computed set of LLRs;
means for obtaining soft symbols associated with the received data stream using the computed set of LLRs; and
means for computing the estimates of the wireless channel using the obtained hard symbols and statistics of the obtained soft symbols.

40. The apparatus of claim 36, wherein the estimates of the wireless channel are updated according to an affine soft decision directed channel estimation algorithm.

41. The apparatus of claim 36, wherein the estimates of the wireless channel are updated according to a linear soft decision directed channel estimation algorithm.

42. A computer-program product for wireless communications, comprising a computer-readable medium comprising instructions executable to:
receive a pilot signal and at least one data stream transmitted over a wireless channel;
compute initial estimates of the wireless channel using the received pilot signal;
de-map, de-rate match and decode the received data stream using the computed initial estimates of the wireless channel to compute a set of log-likelihood ratios (LLRs) of transmitted bits of the data stream;
update estimates of the wireless channel using the computed set of LLRs and the computed initial estimates of the wireless channel; and
de-map, de-rate match and decode the received data stream using the updated estimates of the wireless channel.

43. A wireless node, comprising:
at least one antenna;
a receiver configured to receive via the at least one antenna a pilot signal and at least one data stream transmitted over a wireless channel;
an estimator configured to compute initial estimates of the wireless channel using the received pilot signal; and
a de-mapper, a de-rate matching circuit and a decoder configured to de-map, de-rate match and decode the received data stream using the computed initial estimates of the wireless channel to compute a set of log-likelihood ratios (LLRs) of transmitted bits of the data stream,
wherein the estimator is also configured to update estimates of the wireless channel using the computed set of LLRs and the computed initial estimates of the wireless channel, and
wherein the de-mapper, the de-rate matching circuit and the decoder are also configured to de-map, de-rate match and decode the received data stream using the updated estimates of the wireless channel.

* * * * *